June 18, 1940.  E. C. S. CLENCH  2,205,346
REMOTE CONTROL SYSTEM
Filed March 3, 1938  5 Sheets-Sheet 1

INVENTOR
Edward C. S. Clench
BY
Martin J. Finnegan  ATTORNEY

June 18, 1940.  E. C. S. CLENCH  2,205,346
REMOTE CONTROL SYSTEM
Filed March 3, 1938   5 Sheets-Sheet 4

INVENTOR
Edward C. S. Clench
BY
Martin J. Finnegan ATTORNEY

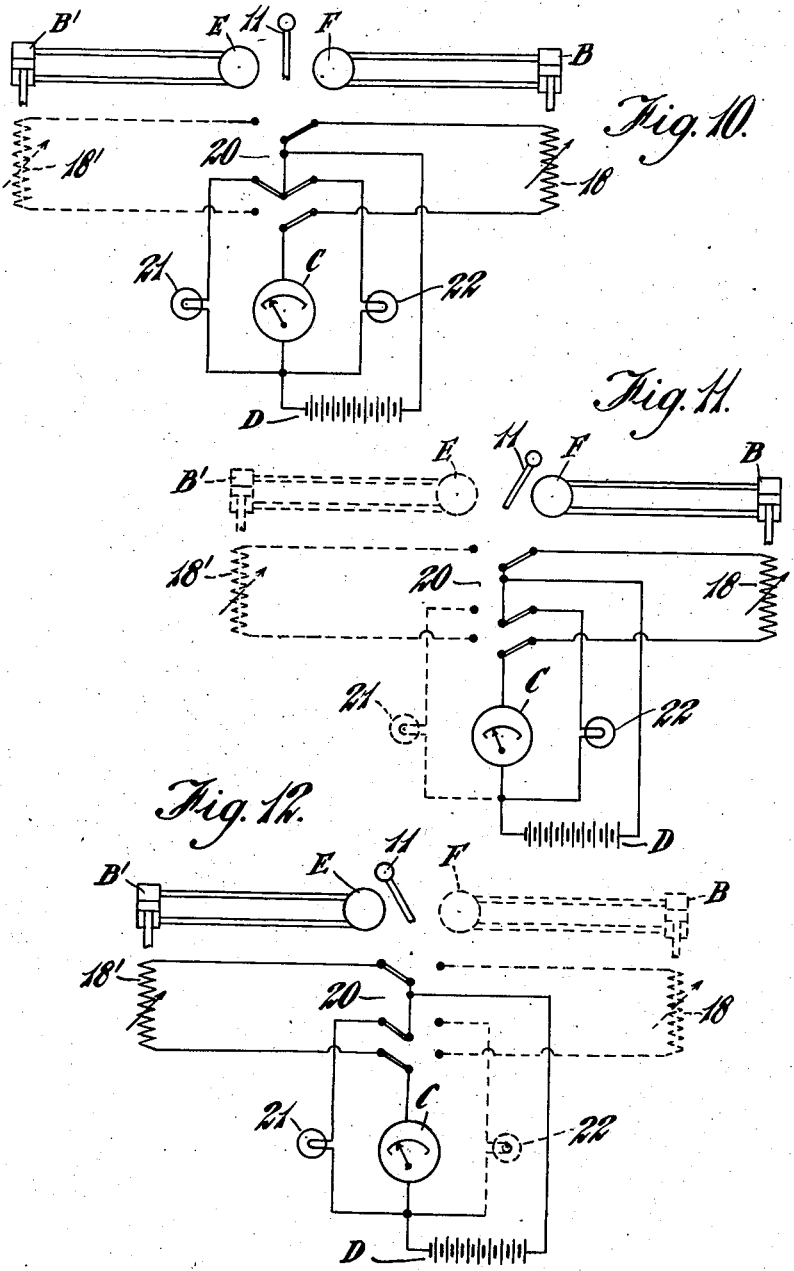

Patented June 18, 1940

2,205,346

UNITED STATES PATENT OFFICE 2,205,346

REMOTE CONTROL SYSTEM

Edward Claude Shakespeare Clench, Leamington Spa, England, assignor to Automotive Products Company Limited, London, England Application March 3, 1938, Serial No. 193,791
In Great Britain March 11, 1937

11 Claims. (Cl. 60—52)

The invention relates to remote control systems for the control of rotating members, engines and other driving devices.

It is known that in multi-engined aircraft, particularly in those equipped with high power engines, there occurs a so-called "beat effect", when the engines are running nearly but not quite at equal speeds. The production of beats is not only uncomfortable to the passengers and crew of the aircraft, but is dangerous as it gives rise to vibrations of considerable amplitude, and also enables the aircraft to be detected more easily by the sound emitted, which presents a great drawback for military aircraft. On the other hand, for the adjustment of the engines of a multi-engined aircraft, in which the engines are carried upon the wings, it is important that the accuracy of adjustment should not be affected by relative movement between the engines themselves and the fuselage carrying the cabin from which the engines are controlled. This relative movement may sometimes reach a substantial extent and prevent accurate operation of mechanical controlling means, which may result in fluctuation of the speed of the engines and the production of a beat effect from time to time.

One object of the invention is to provide a fluid pressure remote control system for adjusting engines or like devices to bring their speeds in perfect synchronism.

Another object of the invention is to eliminate the beat effect in a multi-engined aircraft and suppress the vibrations due to absence of perfect synchronism between the speeds of the various engines or propellers.

Another object of the invention is to provide, in combination with a multi-engined aircraft equipped with variable pitch propellers, a fluid pressure remote control system for adjusting the means which controls the propeller blade incidence.

Another object of the invention is to provide, in combination with a multi-engined aircraft equipped with constant speed governor controlled variable pitch propellers, a fluid pressure control system including a fluid pressure producing means, fluid pressure responsive motors connected to the latter and adapted to adjust the speed responsive governors which control the blade incidence of each propeller, and a controlling device which in one position connects all the motors to the fluid pressure producing means for operating the motors in unison, and in another position connects one of the motors to the fluid pressure producing means for operating said motor independently.

Another object of the present invention is to provide a fluid pressure remote control system including a fluid pressure producing means, fluid pressure operated motors connected to the latter, a controlling device which in one position connects all the motors to the fluid pressure producing means for operating the motors in unison, and in another position connects one of the motors to the fluid pressure producing means for operating said motor independently.

Yet another object of the invention is to provide a fluid pressure remote control system including a fluid pressure producing means, fluid pressure operated motors, pumps incorporated in the fluid pressure producing means and each adapted to feed a respective fluid pressure operated motor, a controlling device which in one position connects the pumps to the motors associated therewith, and in another position connects one pump to the respective motor and renders another pump inoperative.

A further object of the invention is to provide a fluid pressure remote control system including a fluid pressure producing means, fluid pressure operated motors connected to the latter, a controlling device which in one position connects all the motors to the fluid pressure producing means, and in another position connects the fluid pressure producing means to one of the motors for operating it independently, and a remote indicating device showing the setting of the motors.

Other objects and features of the invention and other novel combinations of parts and desirable particular constructions will be apparent from the following description and from the accompanying drawings, in which:

Figure 7 is an enlarged fragmentary view of a clutch device incorporated in the fluid pressure producing means;

Figure 8 is a sectional elevation of one of the fluid pressure responsive motors for adjusting the controlling member of a variable pitch aircraft propeller;

Figure 9 is an enlarged fragmentary view showing the means used for locking the piston of the fluid pressure responsive motors and Figures 10, 11 and 12 are diagrammatic views illustrating the action of the electrical indicating system.

Figure 1:
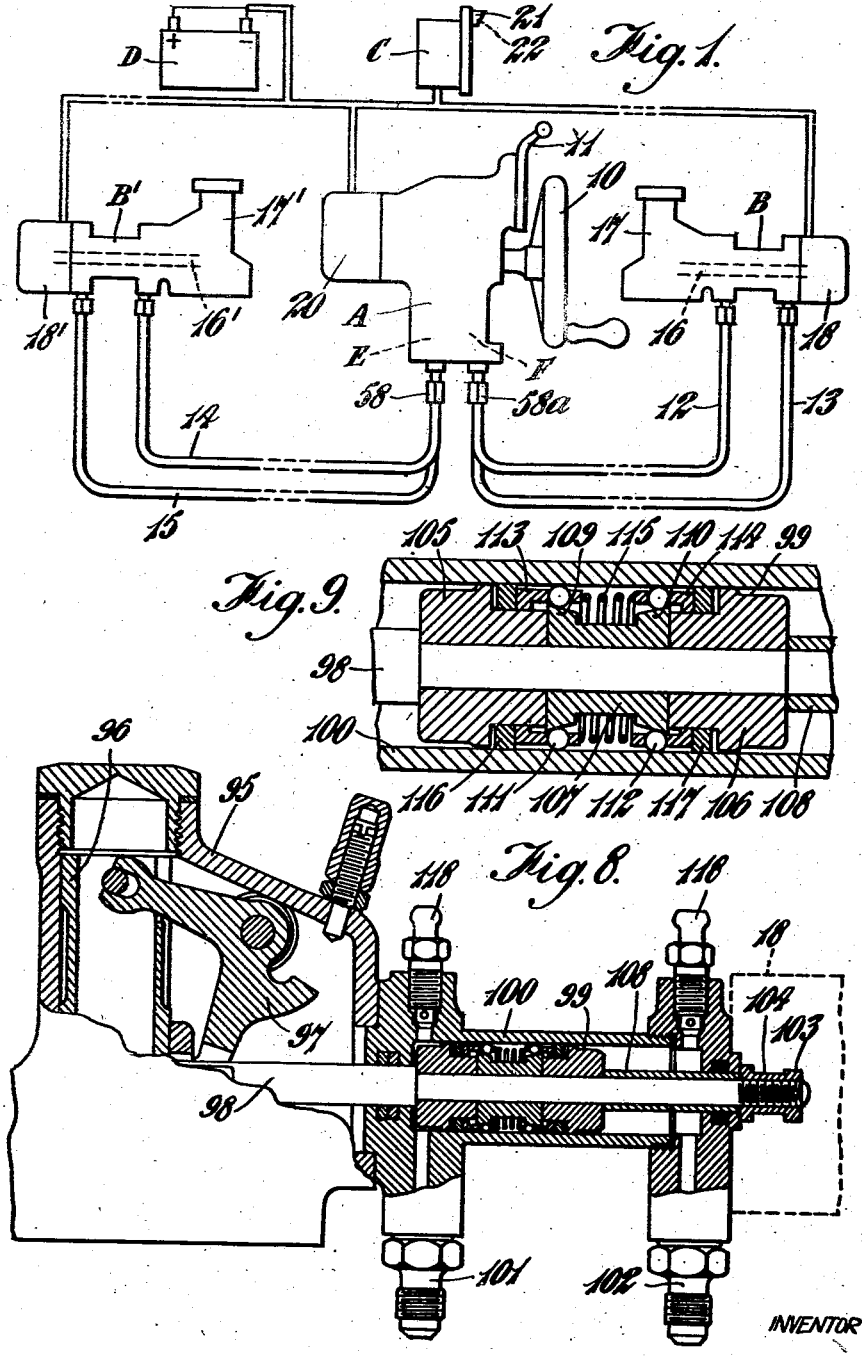
Figure 1 is a diagrammatic view of a fluid pressure control system in accordance with my invention.

Referring to the drawings, Figure 1 shows a fluid pressure remote control system intended to be used on a two-engined aircraft equipped with automatic variable pitch propellers, and it comprises a manually operated fluid pressure producing means A which is placed so that the pilot can conveniently rotate a hand wheel 10 and actuate a lever 11 of a control device. Such a fluid pressure producing means may be of the type covered by my United States patent application Serial No. 124,153, filed on February 4th, 1937 and issued as Patent No. 2,155,529. Rotation of the wheel 10 with the lever 11 in its central position causes liquid to be forced through one of a pair of conduits 12 and 13 to a fluid pressure responsive motor B and also through the corresponding conduit 14 or 15 to another motor indicated at B'. Each of the motors has a piston rod 16, 16' which sets a variable pitch propeller mechanism within a casing 17, 17' and simultaneously operates a variable electrical resistance indicated at 18 and 18' respectively. These are connected with an indicating device C which can conveniently be seen by the pilot and may consist of an ohm-meter supplied with current from a battery D. An electric switch 20 at the rear of the fluid pressure producing means A is actuated by the lever 11, and is arranged so that when said lever is in its middle position the resistance 18 is coupled to the indicator C. Thus, by rotating the hand wheel 10 liquid is forced into both motors B and B', so operating them in unison, the setting of the motor B being shown by the indicator C. By moving the lever 11 in the appropriate direction the conduits 12 and 13 and the motor B are cut out and rotation of the hand wheel 10 causes liquid to be fed only to the motor B'. Also the switch 20 causes the indicator C to be coupled with the variable resistance 18', so that the position or setting of the piston rod 16' can be accurately set or trimmed to exactly the same adjustment as the rod 16 in the motor B. If it is desired to check the setting of the motor B the lever 11 can be moved to its opposite extreme position, in which the motor B' in turn becomes isolated. The indicator C is conveniently fitted with a pair of indicator lamps 21 and 22 for the purpose of showing which of the motors is or are operative.

Figure 3:
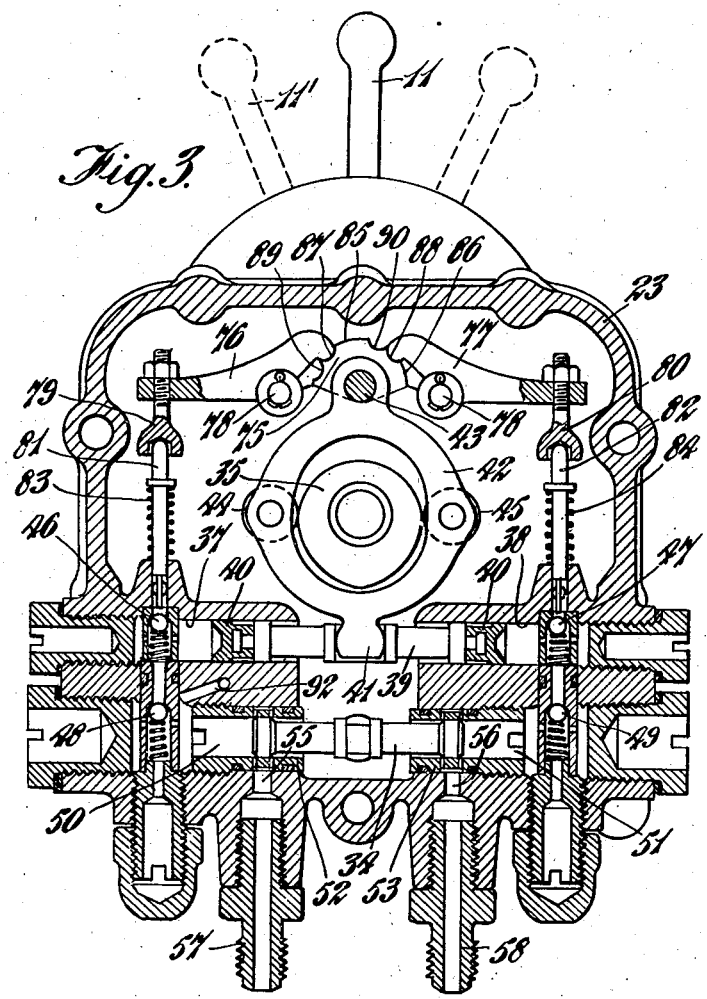
Figure 3 is a transverse sectional elevation on the line 3—3 of Figure 2.
Figure 4:
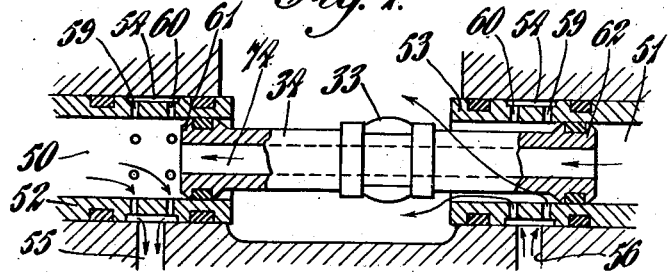
Figure 4 is a fragmentary section to an enlarged scale showing the action of the delivery valve.
Figure 5:
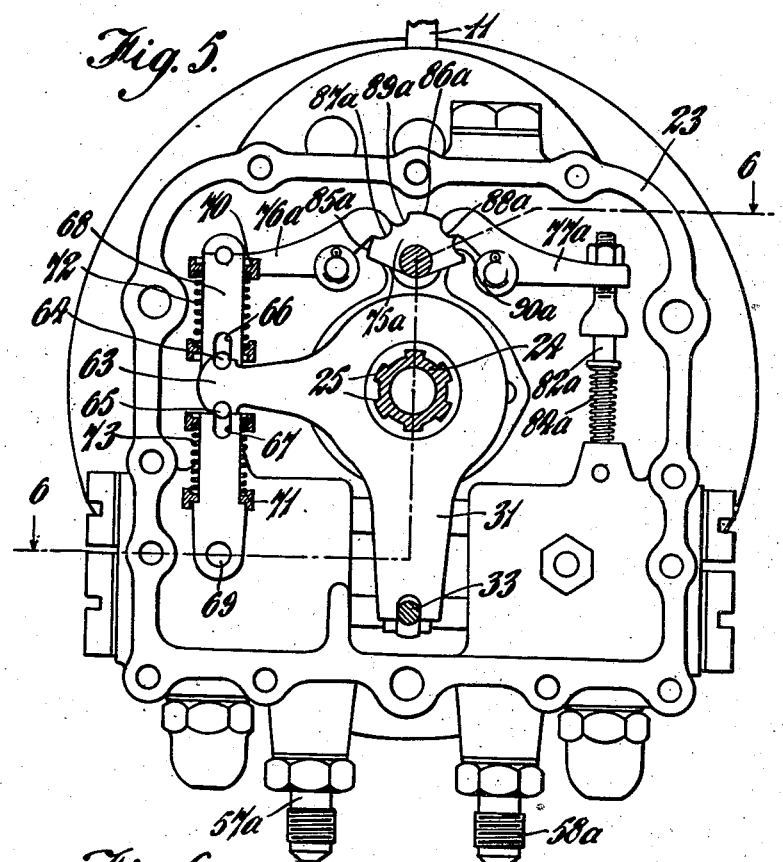
Figure 5 is a transverse section on the line 5—5 of Figure 2.

The construction of the fluid pressure producing means A is shown in Figures 2 to 7. An outer casing 23 which serves as a reservoir for operating liquid is fitted with a shaft 24 carrying the hand wheel 10. At its central part this shaft is splined as indicated at 25, and carries rigidly a flange 26 against which bears a friction disk 27. Another flange 28 is slidably mounted upon the shaft 24 and carries a diametral pin 29 which extends through slots in the shaft 24 and is forced to the left by a coiled compression spring 30 housed within said shaft. An arm 31, which as illustrated in the drawings, is composed of two thicknesses of sheet metal is freely pivoted upon the shaft 24 between the friction disk 27 and a similar disk 32, the lower end of the arm 31 being forked as shown in Figure 5 to embrace the centre part of a coupling rod 33 adapted to actuate delivery valve members 34 and 34a which will hereinafter be described.

The shaft 24 also carries a pair of cams 35 and 35a which are rotatably mounted upon said shaft, but are connected with the flanges 26 and 28 respectively by means of dog clutch teeth indicated at 36 and 36a. The construction of these teeth will be clear from Fig. 7, and it will be seen that there is an appreciable clearance between said teeth to allow a lost motion between the shaft 24 and the cams 35, 35a.

Figure 2:
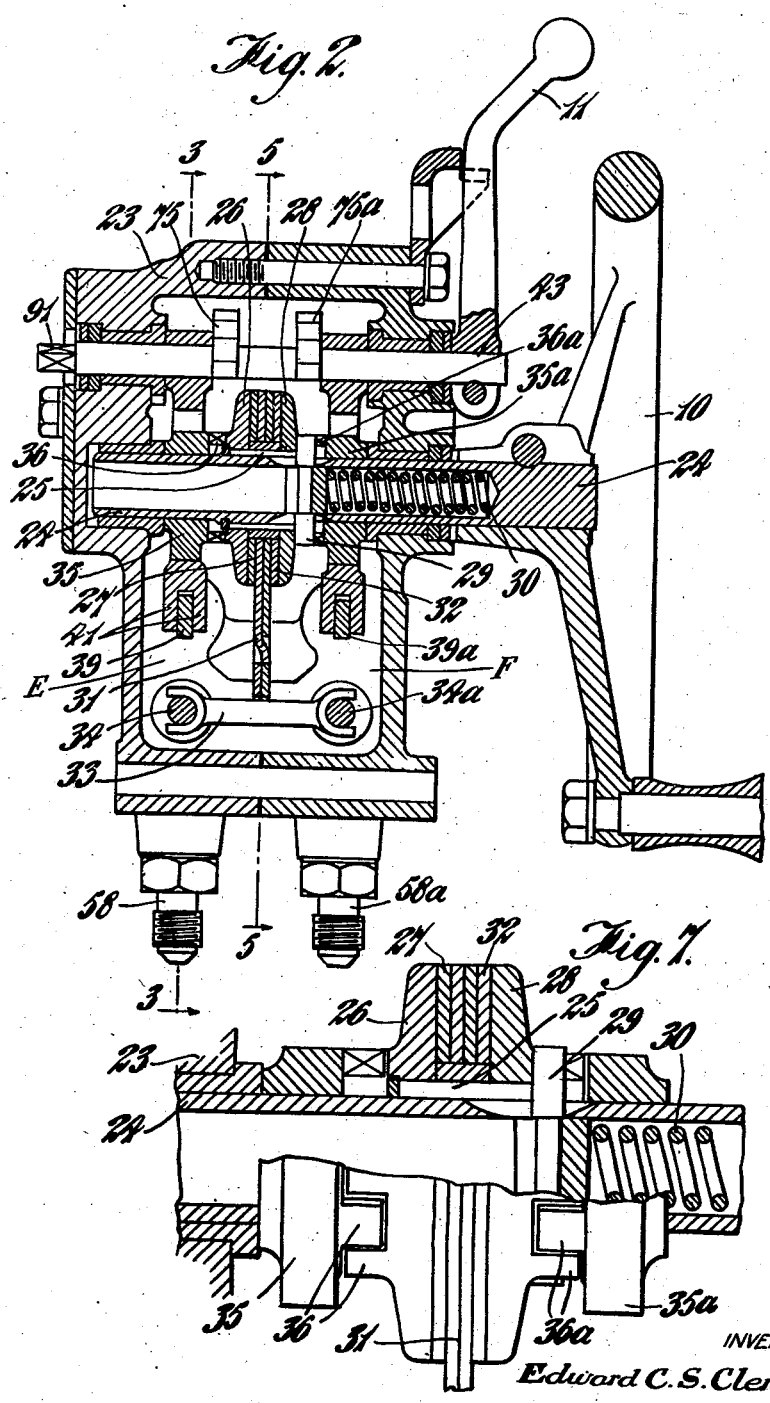
Figure 2 is a longitudinal sectional elevation through the fluid pressure producing means.

The two cams 35 and 35a respectively actuate a pair of pumps E and F which are arranged side by side and which are identical in construction, the pump E on the left hand side of Figure 2 being shown in section in Figure 3.

The casing 23 is thickened at its bottom part and is bored to form a pair of coaxial cylinders 37 and 38 in which a double-ended piston element 39 is adapted to reciprocate, said element being provided with a packing cup 40 at each end. The centre part of the piston element is flattened and is engaged between a pair of lugs 41 carried by an oscillating cam follower 42 which may have the form of a substantially circular frame which is pivotally mounted at its upper part upon a spindle 43, on which is secured the lever 11. The follower 42 embraces the cam 35 and carries a pair of rollers 44 and 45 which are in permanent engagement with said cam. Each of the cylinders 37 and 38 is provided with a spring-loaded inlet valve 46 and 47 respectively and with a corresponding spring-loaded discharge valve 48 and 49 respectively. For the pump shown in Figure 3 the casing 23 is also drilled at each side to form a pair of chambers 50 and 51, which are fitted with fixed sleeves 52 and 53 respectively. A delivery valve member 34 is mounted in said sleeves and is adapted to slide in the latter. The construction of the feed valve member 34 is shown more clearly in Figure 4, from which it will be seen that the sleeves 52 and 53 are grooved circumferentially to form annular passages 54 which are in permanent communication with passages 55 and 56 leading to unions 57 and 58 which are respectively connected to the conduits 15 and 14. In each of the sleeves 52 and 53 two circumferential series of ports 59 and 60 are drilled which cooperate with piston heads 61 and 62 upon the extremities of the delivery valve member 34, the axial length of each piston head and the distance separating said heads being such that when the valve member 34 is in its central position, as shown in Figure 3, each of said piston heads lies between the corresponding sets of ports 59 and 60 without closing them. This is the position occupied by the delivery valve member 34 when the pump is inoperative, i. e., when the hand wheel 10 is quite unconstrained. It will thus be seen that the two conduits 15 and 14 are placed in communication with the interior of the casing 23 by way of the corresponding sets of ports 60. The delivery valve member 34 is caused to assume this position by a self-centering device, the details of which are shown in Figure 5. It will be seen that the arm 31 has a lateral projection 63, the extremity of which is notched to engage a pair of short pins 64 and 65 slidably mounted in slots 66 and 67 cut in a guide strip 68. The latter is pivotally supported at 69, and is fitted with abutment washers 70 and 71 on which a pair of coiled compression springs 72 and 73 respectively take support. The inner ends of these springs engage the pins 64 and 65 and thus tend to return the arm 31 and the valve members 34 and 34a to their central positions. The force exerted by each of the springs 72 and 73 in opposing the movement of the arm 31 is, however, insufficient to resist the torque which the clutch device 26, 28 is capable of transmitting, and it will, therefore, be seen that when the hand wheel 10 is rotated for instance in a clockwise direction (that is anticlockwise when viewed from the back as in Figures 3 and 5) the initial part of this movement is transferred to the arm 31, rocks the latter and causes the spring 73 to be compressed until the pin 65 contacts with the lower end of the slot 67. This movement is transmitted to the delivery valve members 34 and 34a, both of which then occupy the position shown in Figure 4. During this initial movement the clearance between the teeth of the dog clutch devices 36 and 36a has been taken up so that continued angular movement of the shaft 24 is imparted to the two cams 35 and 35a, thus reciprocating the piston elements 39 and 39a of the individual pumps E and F on the left and right hand sides respectively of Figure 2, while the arm 31 is kept in place owing to a slipping between the latter and the friction disks 27 and 32. As previously mentioned both of these pumps work simultaneously and in an identical manner so that the action of only that pump shown in section in Figure 3 will now be described. Rotation of the cam 35 causes the follower 42 to be oscillated, thus forcing liquid from the cylinders 37 and 38 into the chambers 50 and 51 which are connected together by a passageway 74 bored longitudinally through the valve member 34. Therefore, when the valve member 34 is displaced as shown in Figure 4, the liquid under pressure from both cylinders 37 and 38 passes through the ports 59 and 60 of the chamber 50 and thence reaches the passage 55 and union 57. The liquid rejected by the corresponding motor B' reaches the passage 56, and thence passes through the ports 59 and 60 of the chamber 51 into the reservoir formed by the casing 23. When the desired amount of movement has been imparted and the operator lets go of the hand wheel 10 the spring 73 centralises the arm 31 and returns the valve members 34 and 34a to their central positions, but the cams 35 and 35a are not moved backwards to a corresponding amount owing to the clearance existing in the dog clutch teeth 36 and 36a. When the hand wheel 10 is rotated in the opposite direction the valve member 34 is moved to the left (when viewed from the back as in Figures 3 and 4), and this automatically opens the passage 55 to the reservoir and causes the pressure liquid to be delivered through the passageway 56 for actuating the motor B' in the opposite direction.

The lever 11 is arranged so that when in its central position both of the pumps E and F are allowed to operate in unison, but when said lever is pushed over to either of its extreme positions one or other of the pumps is rendered inoperative. For this purpose the spindle 43 carries a pair of control cams 75 and 75a, one for each pump. The control cam 75 cooperates with a pair of rocker levers 76 and 77 which are pivoted to the casing 23 at 78 and which carry at their outer ends, cupped thrust members 79 and 80 which are conveniently screw-threaded for adjustment purposes. The thrust members 79 and 80 cooperate with push rods 81 and 82 respectively which are normally supported by coiled compression springs 83 and 84, but when said rods 81 and 82 are depressed their lower ends contact with the inlet valves 46 and 47 and serve to hold them off their seats. This, of course, prevents the liquid pressure from being generated in the cylinders 37 and 38, and thus renders the pump inoperative. The pump shown in Figure 3 is required to be thrown out of action in this manner when the lever 11 is moved to the position shown in broken lines at 11', and in this position of the lever 11, un-notched portions 85 and 86 of the periphery of the control cam 75 are brought beneath the inner ends of the rocking levers 76 and 77, thus causing the outer ends of the latter to be depressed. Notches 87 and 88 are formed in the control cam 77 to permit the push rods 81 and 82 to rise free of the inlet valves when the lever 11 is in its central position, and notches 89 and 90 come into action for a similar purpose when the lever 11 is in its right hand position when viewed from the back as in Figure 3. The notches which are formed in the control cam 75a are shown in Figure 5 with the corresponding references followed by the letter a, but it will be appreciated that the inlet valves of this pump have to be opened when the lever 11 is moved to the right hand side as viewed from the back, and for this purpose the position of the unnotched portions and the notches 89a and 90a on the cam 75a is reversed with respect to that on the cam 75. The rear end of the spindle 43 is squared as indicated at 91 for operative connection with the electric switch 20 which is shown in Figure 1, and which can be of any convenient construction.

Figure 6:
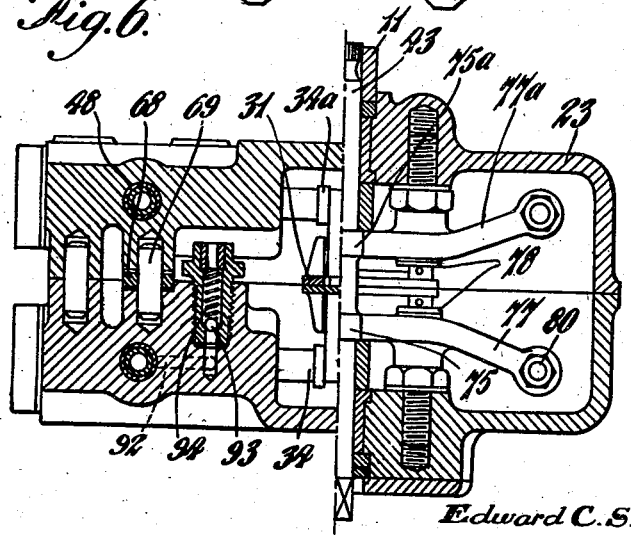
Figure 6 is a sectional plan of the fluid pressure producing means taken on the line 6—6 of Figure 5.

A passage 92 (Figure 3) leads from the chamber 50 of the pump shown, and as will be seen from Figure 6 this passage leads to a ball valve 93 which is held on its seat by a spring 94 so as to act as a safety valve and prevent the working pressure from rising beyond a predetermined value. A similar safety valve (not shown) is also provided in conjunction with the pump at the right hand side of Figure 2.

Constructional details of one of the fluid pressure responsive motors are shown in Figures 8 and 9, the other motor being, of course, identical. Such fluid pressure responsive motors may be of the type covered by my U. S. application Serial No. 80,643, filed on May 19, 1936 and issued as Patent No. 2,119,419. A part of the casing of a governor of a variable pitch aircraft propeller is shown at 95, and encloses a slider 96 which is moved by a bell crank lever 97 for the purpose of adjusting the setting of the governor in the known manner. This bell crank lever is in turn actuated according to my invention by a piston rod 98 carrying a piston which is indicated generally at 99, and which slides within a cylinder 100 secured to the casing 95. The piston 99 is double-acting and the two working spaces within the cylinder 100 are connected with the conduits (for instance, 12 and 13, Figure 1) by means of unions 101 and 102 respectively. The outer end of the piston rod 98 carries a lock nut 103 which has an annular groove 104 by means of which it is operatively connected with the adjusting member of a variable electrical resistance, which is indicated at 18 in Figures 1 and 8.

Since, in normal position, the fluid pressure producing means automatically places the conduits into communication with the reservoir, it is very desirable, if not essential, that automatic locking means should be provided for each motor, and in the present example such locking means are incorporated in the piston 99 as will be seen more clearly from Figure 9. The piston comprises a pair of end members 105 and 106 and an intermediate member 107, these parts being clamped in position by the lock nut 103 acting through a distance tube 108. The intermediate member 107 is formed at each end wth a radial flange 109 and 110 having frusto-conical outer surfaces which are engaged respectively by rows of balls 111 and 112. The balls are mounted in cage members 113 and 114 which are of L-shaped radial section, and which are normally urged apart by a coiled compression spring 115 so as to cause the balls to jam between the flanges 109 and 110 and the inner surface of the cylinder 100. Packing washers 116 and 117 prevent the leakage of operating liquid from one side of the piston to the other and also serve to release the appropriate row of balls automatically under the action of the pressure liquid. Thus, assuming the piston is to be moved to the right as seen in Figures 8 and 9, pressure liquid passing through the union 101 acts upon the packing ring 116 and causes it to displace the cage 113 and the balls 111 towards the right. This, of course, enables the liquid pressure acting upon the member 105 to move the piston along the cylinder, since the balls 111 are released and the balls 112 are ineffective to prevent movement in this direction. When the operator leaves go of the hand wheel 10 the conduits 12 and 13 are placed in communication with the reservoir and the spring 115 immediately forces the balls 111 into locking engagement with the cylinder wall, thus accurately preserving the new setting of the piston rod 98. The usual bleed plugs for releasing air when filling the system with fluid are indicated at 118.

The electrical indicating means forms an important part of the system, and its action is shown diagrammatically in Figures 10 to 12 which should be considered in conjunction with Figure 1. When the lever 11 is placed in its central position as shown in Figure 10, both of the pumps E and F are operative to actuate the motors B' and B respectively, and the switch 20 makes the connection shown so that both of the indicator lamps 21 and 22 are in operation, but the indicator C is placed only in connection with the resistance 18 corresponding to the motor B on the starboard side of the aircraft. In this position the system is thus suitable for the adjustment of the motors B and B' in unison, and it will be appreciated that as the two pumps E and F have equal displacement the pistons in the motors B and B' will move to substantially equal extents. It is extremely important, however, that the governors on the propellers should be adjusted within very fine limits, and therefore the present system also enables each of the motors to be adjusted individually by manipulation of the same hand wheel 10. Thus, the lever 11 may be moved to the left as shown in Figure 12, so throwing the pump F out of action and at the same time connecting the indicator C with the resistance 18' instead of the resistance 18. Alternatively, the lever 11 may be moved to the right as shown in Figure 11 for the purpose of finely adjusting the motor B.

As it appears from the foregoing, the invention has been described in connection with variable pitch propellers for aircraft fitted with governors which themselves automatically adjust the propeller blade incidence so as to keep the speed constant and the remote control system is used to adjust the governors themselves. Where ignition compression engines are employed the system can be utilized for directly or indirectly controlling the fuel injection, and other methods may be devised. The invention can also be applied to marine vessels having a plurality of engines, which require to be adjusted simultaneously so as to avoid affecting the course of the ship, and then to be accurately matched.

The fluid pressure remote control system may, of course, take forms other than the specific example described, and various modifications are apparent.

An indicating means, such as that described herein, may be used or not as desired, as it may be possible in some instances to regulate the engines accurately from the instruments which form part of the normal aircraft equipment. Thus, for example, the revolution indicators may be utilized as a guide to the prevailing setting of the fluid pressure responsive motors, or alternatively the final trimming may be carried out so as to eliminate the beat effect.

Having described my invention, I am aware that numerous and extensive departures may be made from the embodiment herein illustrated and described but without departing from the spirit of my invention.

Having thus described the various features of the invention, what I claim as new and desire to secure by Letters Patent is:

1. A fluid pressure remote control system including a fluid pressure producing means, fluid pressure responsive motors, pumps incorporated in the fluid pressure producing means and corresponding in number to the number of said motors, with each pump having individual connections leading to its corresponding motor, means controlling the operation of the pumps, and means for putting all the pumps in operative connection with their respective motors in one position of the controlling means, said means being adapted to put a selected one of said motors in operative connection with its respective pump in another position of the controlling means.

2. A fluid pressure control system including a fluid pressure producing means, fluid pressure responsive motors, pumps incorporated in the fluid pressure producing means and each connected to a respective motor, a reservoir, an inlet valve in each pump controlling the admission of fluid from the reservoir, and means controlling selectively the inlet valves of the respective pumps, whereby one of said pumps may be rendered operative to supply fluid to its respective motor independently of operation of the other pumps and motors.

3. A fluid pressure remote control system including a plurality of pumps, a reservoir, fluid pressure responsive motors actuated by the pumps, each pump being connected to a respective motor, actuating means for operating the pumps in common, valve means controlling the discharge of fluid from the pumps to the respective motors and which in normal position connect the motors to the reservoir, means connecting the valve means to the pump actuating means and displacing it in opposite directions according to the direction of movement of the actuating means for energizing said motors in opposite directions, and a slipping clutch incorporated in said connecting means.

4. A fluid pressure remote control system including a plurality of pumps, a reservoir, fluid pressure responsive motors actuated by the pumps, each pump being connected to a respective motor, means for operating the respective pumps, means actuating in common the pump operating means, valve means controlling the discharge of fluid from the pumps to the respective motors and which in normal position connect the motors to the reservoir, means connecting to the pump operating means for displacing the valve means from normal to operative position, in which latter position each pump is effective to energize its respective motor, a slipping clutch incorporated in the connecting means, and a lost motion connection in the means operating the pumps corresponding to the displacement of the valve means from normal to operative position.

5. A fluid pressure remote control system according to claim 4 including centralising means which urge to normal position the valve means controlling the discharge of fluid from the pump.

6. A fluid pressure remote control system according to claim 4 including centralising means which urge to normal position the valve means controlling the discharge of fluid from the pumps, and stop means limiting the displacement of the means connecting the valve means to the pump operating means.

7. A fluid pressure remote control system including a plurality of pumps, a reservoir, fluid pressure responsive motors actuated by the pumps, each pump being connected to its respective motor, actuating means for operating the pumps in common, valve means controlling the discharge of fluid from the pumps to the respective motors and which in normal position connects the motors to the reservoir, means connecting to the pump actuating means for displacing the valve means from normal to operative position, in which latter position each pump is effective to energize its respective motor, and means incorporated in said connecting means to insure completion of the pump operating action after the valve means has been fully shifted from normal to operative position.

8. A fluid pressure remote control system including a plurality of pumps, fluid pressure responsive motors actuated by the pumps, each pump being connected to its resective motor, actuating means for operating the pumps in common, valve means controlling the discharge of fluid from the pumps to the respective motors and which in normal position connects the motors for free circulation of fluid therebetween, means connecting to the pump actuating means for displacing the valve means from normal to operative position, in which latter position each pump is effective to energize its respective motor, and a slipping clutch incorporated in said connecting means to insure completion of the pump operating action after the valve means has been fully shifted from normal to operative position.

9. A fluid pressure remote control system including a fluid pressure producing means comprising a plurality of pumps, fluid pressure responsive motors, and selector means controlling the operation of the pumps, said selector means in one position rendering all the pumps effective to operate their respective motors, and in another position rendering all but one of said pumps ineffective to permit operation of one motor alone.

10. A fluid pressure remote control system including a plurality of pumps, a reservoir, double acting fluid pressure responsive motors actuated by the pumps, each pump being connected to a respective motor, means for operating the respective pumps, means actuating in common the pump operating means, valve means controlling the direction of the discharge of fluid from the pumps to the respective motors and which, in normal position, connect the motors to the reservoir, means connecting the valve means to the pump operating means for displacing the valve means from normal to operative position, in which latter position each motor is connected at one end to its respective pump and at the other end to the reservoir, and a slipping clutch incorporated in said connecting means.

11. A fluid pressure remote control system including a plurality of pumps, a reservoir, double acting fluid pressure responsive motors actuated by the pumps, each pump being connected to a respective motor, means for operating the respective pumps, means actuating in common the pump operating means, valve means controlling the direction of the discharge of fluid from the pumps to the respective motors and which in normal position connect the motors to the reservoir, means connecting to the pump operating means for displacing the valve means from normal to operative position, in which latter position each motor is connected at one end to its respective pump and at the other end to the reservoir, a slipping clutch incorporated in the connecting means, and a lost motion connection in the means operating the pumps corresponding to the displacement of the valve means from normal to operative position.

EDWARD CLAUDE SHAKESPEARE CLENCH.